United States Patent
Freeman

(10) Patent No.: US 6,618,114 B2
(45) Date of Patent: Sep. 9, 2003

(54) ELECTROOPTICAL DISPLAYS WITH MULTILAYER STRUCTURE ACHIEVED BY VARYING RATES OF POLYMERIZATION AND/OR PHASE SEPARATION DURING THE COURSE OF POLYMERIZATION

(75) Inventor: Gary A. Freeman, Newton, MA (US)

(73) Assignee: Viztec, Inc., Tampa, FL (US)

( * ) Notice: Subject to any disclaimer, the term of this patent is extended or adjusted under 35 U.S.C. 154(b) by 0 days.

(21) Appl. No.: 09/883,083

(22) Filed: Jun. 15, 2001

(65) Prior Publication Data

US 2002/0109807 A1 Aug. 15, 2002

Related U.S. Application Data

(60) Provisional application No. 60/268,235, filed on Feb. 12, 2001.

(51) Int. Cl.$^7$ .................................................. G02F 1/13
(52) U.S. Cl. ....................................... 349/187; 349/183
(58) Field of Search .......................................... 349/183

(56) References Cited

U.S. PATENT DOCUMENTS

| | | | |
|---|---|---|---|
| 4,001,140 A | 1/1977 | Foris et al. .................. 252/316 |
| 4,331,795 A | 5/1982 | Ukita et al. .................. 526/273 |
| 4,678,284 A | 7/1987 | Tashiro ....................... 350/344 |
| 4,688,900 A | 8/1987 | Doane et al. ............ 350/347 V |
| 5,130,831 A | 7/1992 | Kohara et al. ................. 359/81 |
| 5,321,533 A | 6/1994 | Kumar ......................... 359/51 |
| 5,327,271 A | 7/1994 | Takeuchi et al. ............... 359/75 |
| 5,333,074 A | 7/1994 | Hikmet ........................ 359/51 |
| 5,434,685 A | 7/1995 | Pirs et al. .................... 359/51 |
| 5,473,450 A | 12/1995 | Yamada et al. ................ 359/51 |
| 5,474,629 A | 12/1995 | Yamazaki et al. ............. 156/99 |
| 5,494,604 A | 2/1996 | Chung .................... 252/299.01 |
| 5,504,600 A | 4/1996 | Pirs et al. .................... 359/51 |
| 5,530,566 A | 6/1996 | Kumar ......................... 359/51 |
| 5,581,384 A | 12/1996 | Hotta et al. .................. 349/155 |
| 5,583,672 A | 12/1996 | Kim ............................. 349/92 |
| 5,612,803 A | 3/1997 | Yamada et al. ............. 349/188 |
| 5,729,312 A | 3/1998 | Yamagishi et al. ........... 349/86 |
| 5,739,882 A | 4/1998 | Shimizu et al. ............. 349/123 |
| 5,812,232 A | 9/1998 | Shiroto et al. .............. 349/157 |
| 5,940,156 A | 8/1999 | Nishiguchi et al. ......... 349/156 |
| 5,949,508 A | 9/1999 | Kumar et al. ............... 349/122 |
| 6,004,423 A | 12/1999 | Ruedin et al. .............. 156/292 |
| 6,019,284 A | 2/2000 | Freeman et al. ............ 235/380 |
| 6,049,366 A | 4/2000 | Hakemi et al. ............... 349/86 |
| 6,078,378 A | 6/2000 | Lu et al. ..................... 349/155 |
| 6,128,056 A * | 10/2000 | Kubota et al. ................ 349/86 |

* cited by examiner

Primary Examiner—Robert H. Kim
Assistant Examiner—Timothy L Rude
(74) Attorney, Agent, or Firm—Fish & Richardson P.C.

(57) ABSTRACT

A method of manufacturing a liquid crystal display device is disclosed. The method comprises filling the space between two facing substrates with a mixture of pre-polymer and liquid crystal material, applying an external source of energy to initiate a polymerization, wherein as the polymerization proceeds a phase separation of the polymer and liquid crystal is generally also proceeding, after initiation of polymerization and before completion thereof, adjusting a parameter that affects one or both of the rates of polymerization and phase separation, so as to produce a variation in the polymerized structure, wherein the variation is a result of the rates of polymerization and phase separation being adjusted during the course of polymerization.

25 Claims, 3 Drawing Sheets

ELECTROOPTICAL DISPLAYS WITH MULTILAYER STRUCTURE ACHIEVED BY VARYING RATES OF POLYMERIZATION AND/OR PHASE SEPARATION DURING THE COURSE OF POLYMERIZATION

CROSS-REFERENCE TO RELATED APPLICATION

This application claims priority from U.S. Provisional Application Serial No. 60/268,235, filed on Feb. 12, 2001.

BACKGROUND OF THE INVENTION

This invention relates to liquid crystal and other electronic displays.

Commercially, it is highly desirable for an electronic display to be as thin and light as possible while still maintaining a high degree of ruggedness and protection against forces caused by shock, pressure, flexure, and dropping, among other things. In the area of mobile electronics, such as cell phones and personal digital assistants (PDAs), size and weight are critical factors to the commercial success of a product, but currently breakage of the displays within these devices is one of the primary reasons for repairs and product returns. In addition, the need for electronic displays that can actually be bent has been acknowledged in several areas: so-called 'electronic paper' in which fiber paper is replaced with a display would be much more compelling as a product if the electronic display could be rolled up or folded like traditional paper; wearable electronics such as computers or multifunction watches would be much more comfortable to the wearer if the display were to conform to the user's body; chip cards which have strict flexure life-test performance standards would be able to incorporate flexible displays and still conform to those standards. Replacement of the glass substrates within displays with plastic film has been an area of active research within the display community for a number of years.

Several different technologies are under development for use in flexible plastic displays. Electrophoretic displays achieve images via electrophoretics—the rapid migration of microparticles in colloidal suspensions. Light scattering particles are moved within a dyed colloidal suspension by electrostatic forces. The particles will either move toward the viewer, in which case, the typically white particles are seen by the viewer, or to the surface away from the viewer, in which case, the white particles will be hidden by the dark dye.

Cholesteric displays are another display technology being attempted on plastic substrates. When sandwiched between conducting electrodes, cholesteric liquid-crystal material can be switched between two stable states—the so-called focal conic and planar states—in which the liquid crystal's helical structures have different orientations. In the focal conic state, the helical structures are unaligned and the liquid crystal is transparent. In the planar state, the helical structures' axes are all perpendicular to the display's surface resulting in essentially monochromatic transmission by the display.

The Gyricon display being developed by Xerox, is made of microscopic beads, randomly dispersed and held in place between two plastic sheets by a flexible elastomeric matrix of oil-filled cavities. The balls have strongly contrasting hemispheres, black on one side and white on the other. The white side is highly reflective, while the black side absorbs light. Each hemisphere has a unique intrinsic charge, resulting in a force on the ball when an electric field is applied and the axis of the ball is not aligned with the field. The side of the ball presented for display depends on the polarity of the voltage applied to the electrode. In all three of these cases, while they have some positive features such as high contrast and compatibility with plastic substrates, they all currently require high drive voltages, have slow response times, and are not compatible with commercially available drive electronics.

Liquid crystal displays (LCDs) are attractive because of the low drive voltages required to switch them, their relatively fast response times, the wide availability of drive electronics, and the significant intellectual and manufacturing investment in the technology. Attempts have been made to develop LCDs that intermixed the liquid crystal within a polymer matrix in order to make them compatible with plastic substrates, one example being polymer dispersed displays (PDLCDs). PDLCDs are fabricated by intermixing the liquid crystal and a pre-polymer into a solution prior to assembling the display. After assembling the display, the polymer is cured, typically by ultraviolet light. During the polymerization the LC separates out from the polymer into microscopic droplets. Since the droplets of LC are not in contact with any alignment layer, the orientation of the molecules is random and light is scattered by the droplets. Applying a voltage to the electrodes of the PDLCD causes the LC molecules to become aligned, resulting in the display becoming transparent. Like the other flexible displays, PDLCDs required high drive voltages not generally compatible with existing drive electronics. Prior art such as U.S. Pat. Nos. 4,688,900; 5,321,533; 5,327,271; 5,333,074; 5,434,685; 5,473,450; 5,504,600; 5,530,566; 5,583,672; and 5,949,508 all make use of phase separation of an LC/polymer mixture during polymerization of the polymer using light as the curing mechanism (photopolymerization).

Methods have been developed to achieve anisotropically dispersed LC/polymer structures which might have drive voltages lower then those achieved in PDLCDs. U.S. Pat. No. 5,949,508 describes a method in which a lamellar structure is achieved whereby the LC and polymer are disposed on opposite substrates; this reduces the drive voltages necessary to switch the device, but results in a structure where it is only practical to have the rubbed alignment surface on one of the substrates. While this structure is effective with nematic or electrically controlled birefringence (ECB) displays, it becomes more difficult to construct displays such as twisted nematic (TN) and super twisted nematic (STN) which typically require alignment surfaces on both substrates. U.S. Pat. Nos. 5,473,450 and 5,333,074 describe methods of localizing the polymer during photopolymerization by exposing only portions of the device to the light source using masks. Polymer structures of a size on the order of a pixel (~0.3 mm) are achievable, but manufacturing may be more difficult since the photomask must generally be aligned to the electrode structure within the device, and expensive collimated UV light sources must generally be employed. Structures much smaller than 0.3 mm may be difficult to achieve due to the inherent scattering of the LC/polymer mixture. U.S. Pat. No. 5,473,450 teaches the patterning of photoinitiator onto the alignment layer, but this method generally requires a highly accurate, screened deposition of the chemical photoinitiator onto the substrates. Proper alignment of the silk-screening mask to the clear ITO electrodes may be difficult to achieve, and the introduction of chemicals directly onto the polyimide alignment surface may result in poor alignment of the LC to the alignment surface, poor appearance of the display and lower manufacturing yields.

In addition to the breakage problems due to shock and drop, glass substrate displays also have difficulty surviving extremes of temperature. When the temperature of a display is cycled between cold and hot it will sometimes develop small voids between the spacers and the liquid crystal fluid. While the voids are small in size, they typically are noticeable enough that the display will be returned for repair. The voids are due to the mismatch in the thermal coefficients of expansion between the LC and the typically glass or plastic spacers. When a glass substrate display is assembled at room temperature and then sealed, its volume is essentially fixed at that point. As the display is cooled down, both the LC and spacer material will contract but due to the mismatch in the thermal coefficients of expansion and the mechanical discontinuity at the spacers, stress is localized around the spacers and voids develop. Initially, the voids are small areas of vacuum or very low pressure, but the more volatile components of the LC quickly move to a gaseous phase to fill the void to achieve a lower energy equilibrium state. When the display is returned to room temperature, the vapor filling the voids prevents the voids from being absorbed back into the LC, and the damage is typically permanent. Display manufactures have solved this problem by, amongst other methods, utilizing specially fabricated spacers that have a softer, more compliant exterior coating surrounding a core of either glass or plastic. The outer compliant layer acts to relieve the stresses encountered during thermal cycling of the display, thus preventing the voids. Because of the difficulty of manufacturing these spacers, they are often 10–20 times more expensive than regular spacers and so are often used only when absolutely necessary.

SUMMARY OF THE INVENTION

In general, the invention features a method of manufacturing a liquid crystal display device, he method comprises filling the space between two facing substrates with a mixture of pre-polymer and liquid crystal material, applying an external source of energy to initiate a polymerization, wherein as the polymerization proceeds a phase separation of the polymer and liquid crystal is generally also proceeding, after initiation of polymerization and before completion thereof, adjusting a parameter that affects one or both of the rates of polymerization and phase separation, so as to produce a variation in the polymerized structure along a direction normal to the two facing substrates, wherein the variation is a result of the rates of polymerization and/or phase separation being adjusted during the course of polymerization.

In preferred implementations, one or more of the following features may be incorporated. At least a first and second layer may be formed within the liquid crystal display device with the first and second layers overlying one another and being positioned at different locations along the direction normal to the two facing substrates, wherein the structure of the first and second layers is different as a result of the rates of polymerization and/or phase separation being different during the time that the layers are formed. The variation in the polymerized structure may change in a continuous fashion as a result of the rates of polymerization and/or phase separation being different during the time that the structure is formed. The rate of polymerization may be adjusted. The rate of polymerization may be changed abruptly so as to produce stepwise change in polymerization rate. The polymerization may be adjusted so as to produce a continuous function of time that may take the form of a ramp, an exponential curve, or other mathematical function. The intensity of a light source affecting the rate of polymerization may be adjusted to adjust the rate of polymerization. The light source may be ultraviolet light. The rate of phase separation may be adjusted. The rate of phase separation may be changed abruptly so as to produce stepwise change in phase separation rate. The phase separation may be adjusted so as to produce a continuous function of time that may take the form of a ramp, an exponential curve, or other mathematical function. The temperature may be adjusted to adjust the rate of phase separation. The first layer may be primarily polymer. The second layer may be primarily a mixture of polymer and liquid crystal material. The invention may further include a third layer, different in structure from the first and second layers as a result of the relative rate of polymerization and phase separation being different during the time that the layers are formed. The third layer may be primarily liquid crystal material. The second layer may contain droplets of liquid crystal material within surrounding polymer. The droplets of liquid crystal may be in contact with a substrate. The pre-polymer and liquid crystal may be of such a composition and the polymerization may occur under such conditions that the structure of the first and second layer can be determined by varying the miscibility of the pre-polymer and liquid crystal material. The pre-polymer and liquid crystal may be of such a composition and the polymerization may occur under such conditions that the structure of the first and second layer can be determined by varying the viscosity of the pre-polymer and liquid crystal. The viscosity may be the relative viscosity of the pre-polymer and liquid crystal. The viscosity may be the absolute viscosity of the pre-polymer and liquid crystal.

DETAILED DESCRIPTION OF THE INVENTION

Figure 1:
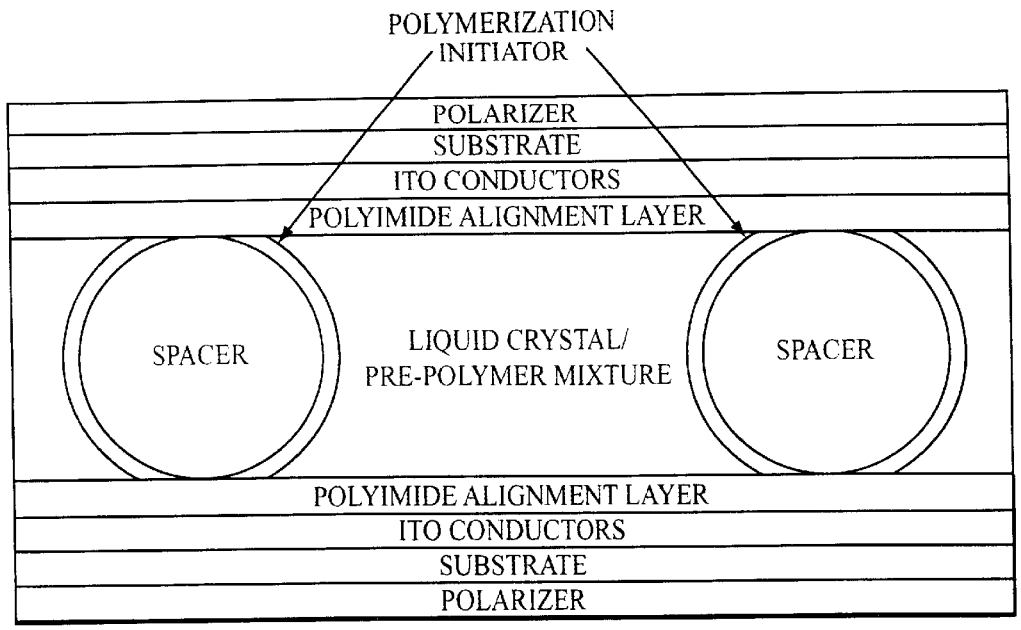
FIG. 1 shows a cross section of a liquid crystal display device that uses spherical spacers coated with a photoinitiator prior to exposure to the developing light.

According to the present invention, in the preferred embodiment shown in FIG. 1, a liquid crystal display device is assembled using the following procedure:

1. The substrates are a flexible polymer material with a low level of birefringence to improve the optical qualities of the final product and having a glass transition temperature greater than 150 degrees C. in order to facilitate the various drying and baking operations. A polymer that meets these requirements is polyethersulphone (PES). A vapor barrier is coated onto the outside surface of the substrate to improve the reliability and product life of the display; the vapor barrier is typically composed of a thin film laminate structure of silicon oxide and another polymer.

2. The substrates are coated with a vacuum-deposited layer of typically indium tin oxide (ITO), which is a transparent conductor. The ITO is then patterned via chemical, electron beam, or laser etching.

3. A mixture is prepared of approximately 10% photoinitiated pre-polymer such as Norland Products NOA-65 and 90% liquid crystal such as Merck E7. The pre-polymer formulation has been modified such that all photoinitiator has been removed from the formulation.

4. A polyimide solution is coated onto the ITO side of at least one of the substrates and baked at a temperature of 150 degrees C. for one hour. The polyimide surface(s) are then rubbed to develop an alignment layer for the liquid crystal.

5. Glass spacers of a diameter of 3–3.5 $\mu$m are surface-etched using a 1.25% solution of hydrofluoric acid for 10 minutes while suspended in solution in an ultrasonic vibration tank. After washing, the etched spacers are then coated with a mixture of methacrylate silane and a photoinitiator by immersing the spacers into a solution containing the initiator and an adhesion promoter such as a silane and then spraying the spacers into the top of a vertical drying column onto the substrate(s). Silanes improve the bonding between glass and polymers via chemical bonding at the silane/glass interface and a dispersion of the polymer into the silane at the silane/polymer interface.

6. Spacers are deposited onto the substrate surface in large numbers (with a density of at least about 30 spacers/$mm^2$). The spacers tend to be distributed generally randomly across the substrate surface.

7. The LC/prepolymer mixture is deposited in sufficient quantity onto both inner faces of the substrates, and the substrates are laminated together while maintaining the proper alignment between the ITO patterns on the upper and lower substrates.

8. Both sides of the cell are then exposed to UV light that causes scission of the photoinitiator and release of free radicals around the spacers. The polymerization reaction will then proceed with the initiation sites centered around each spacer that was deposited with the initiator.

9. The rate of polymerization is set at the beginning of the process by adjusting the UV intensity, while the rate of diffusion of the LC and pre-polymer is changed by adjusting the reaction temperature. Diffusion rates can also be controlled via the pre-polymer viscosity as well as by the choice of the LC and pre-polymer to achieve the appropriate degree of miscibility of the two liquids. By adjusting the diffusion and reaction rates, the resulting LC/polymer structure can provide the desired morphology. For full phase separation, temperatures will typically be in excess of 45 degrees C. with a pre-polymer viscosity less than 1000 cps though specific numbers will be dependent upon the other variables affecting the phase separation process.

Figure 2:
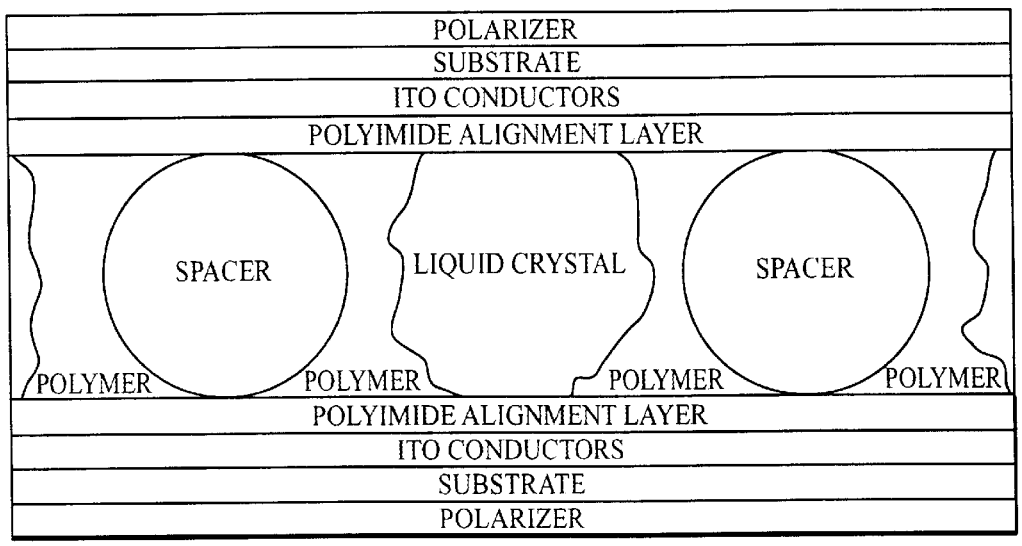
FIG. 2 shows a cross section of a liquid crystal display device that uses spherical spacers coated with a photoinitiator after exposure to the developing light.

The resulting display shown in FIG. 2 is quite flexible. It can be flexed without permanent damage by at least the amount of flexing specified in the flexing tests described in U.S. Pat. No. 6,019,284, hereby incorporated by reference.

It is not necessary that polymer form in the vicinity of each spacer, nor that the polymer extend fully from one substrate to another in all cases. Some spacers, for example, may not have been coated with PIE material, or they may have been imperfectly coated.

Polymer supports that do not extend fully from one substrate to the other may still be of benefit in creating isolated regions of liquid crystal, and thereby make possible improved bistability of certain ferroelectric liquid crystal materials, which may exhibit improved bistability if the liquid crystal layer is divided into discrete droplets along one substrate.

In an alternative embodiment the polymerization initiator is not activated by light but rather is the 'accelerator lacquer' type. When using an accelerator lacquer initiator, coating of the spacers is accomplished via the method as previously described, but the polymerization begins to occur automatically at some time after the LC/polymer mixture is brought into contact with the initiator-coated spacers. Lamination is performed at room temperature in order to lengthen the time before cure begins. After lamination has been completed, the temperature is raised in order to increase the diffusivity of the LC and pre-polymer. In addition, the aromatic amines in the pre-polymer formulation and the peroxide in the lacquer are chosen so as to provide the correct free radical generation rate which, when combined with the diffusion rates of the pre-polymer and LC and the spacings within the display region, result in the polymer localized to the region surrounding the spacers.

Figure 3:
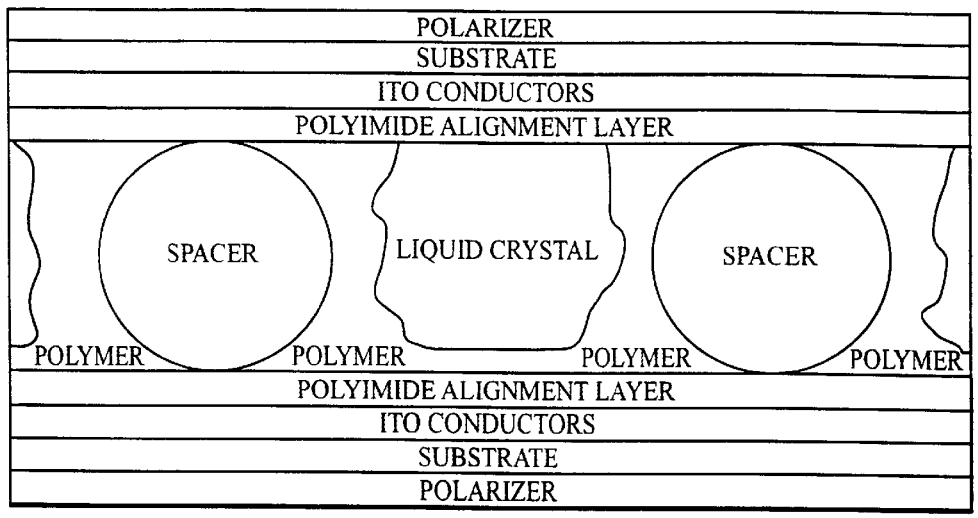
FIG. 3 shows a cross section of a liquid crystal display device that uses spherical spacers coated with an accelerator after polymerization and exposure to the developing light.

In another embodiment, the pre-polymer formulation retains its photoinitiator component but the spacers are still coated with an adhesion promoter such as a silane coating along with an accelerant or additional photoinitiator. Typical active ingredients in the accelerant would be a tertiary amine like dimethyl aminobenzene. The curing in this case will be initiated by both the accelerant and the light. The accelerant reaction is allowed to proceed for a sufficient period of time to localize most of the polymer around the spacers. The light source is then turned on only on one side, resulting in a deposition of any of the remaining polymer along the substrate closest to the light source as shown in FIG. 3. This particular embodiment can be further refined by using liquid crystals capable of bistability, i.e., the ability to maintain two or more electrooptic states without any electric field being present. Some examples of such a bistable or multistable liquid crystal are those of the ferroelectric or anti-ferroelectric type. In a further refinement, the reaction rate is varied during the course of polymerization to create a structure in which liquid crystal droplets interspersed in the polymer are created on the alignment surface nearest to the light source and a thin layer of the liquid crystal is created on the alignment surface opposite the light source. Both surfaces are aligned in such a configuration so as to produce alignment of the LC molecules on both surfaces, but droplet-encapsulated LC is known to be a more durable structure in terms of maintaining bistability.

Figure 4:
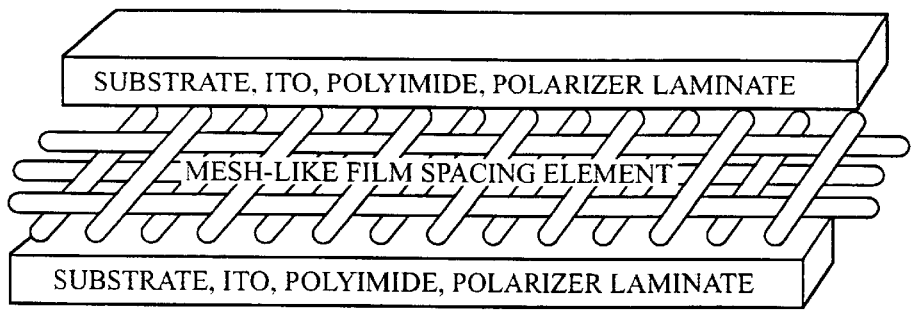
FIG. 4 shows a cross section of a liquid crystal display device that uses a mesh-like spacing membrane.
Figure 5:
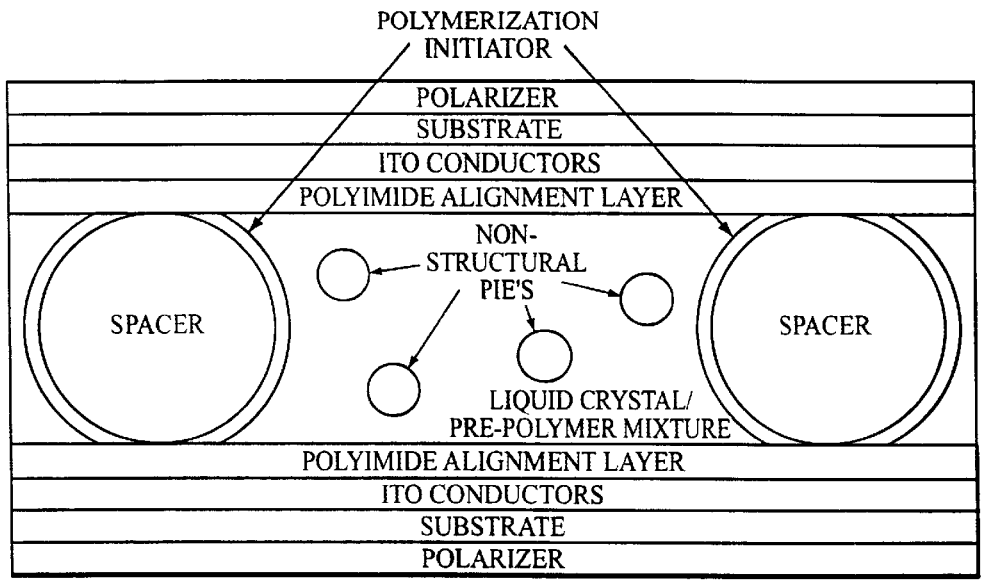
FIG. 5 shows a cross section of a liquid crystal display device that uses spherical spacers coated with a photoinitiator and non-structural polymer initiation or enhancement (PIE) elements prior to exposure to the developing light.

In another preferred embodiment shown in FIG. 4, a liquid crystal display device is assembled using the following procedure:

1. The substrates are a flexible polymer material with a low level of birefringence to improve the optical qualities of the final product and having a glass transition temperature greater than 150 degrees C. in order to facilitate the various drying and baking operations. A pro polymer which meets these requirements is poly-ethersulphone (PES). A vapor barrier is coated onto the outside surface of the substrate to improve the reliability and product life of the display; the vapor barrier is typically composed of a thin film laminate structure of silicon oxide and another polymer.

2. The substrates are coated with a vacuum-deposited layer of typically indium tin oxide (ITO) which is a transparent conductor. The ITO is then patterned via chemical, electron beam, or laser etching.
3. A mixture is prepared of approximately 10% photoinitiated pre-polymer such as Norland Products NOA-65 and 90% liquid crystal such as Merck E7. The pre-polymer formulation has been modified such that all photoinitiator has been removed from the formulation.
4. A polyimide solution is coated onto the ITO side of at least one of the substrates and baked at a temperature of 150 degrees C. for one hour. The polyimide surface(s) are then rubbed to develop an alignment layer for the liquid crystal.
5. Glass spacers of a diameter of 3–3.5 $\mu$m are surface-etched using a 1.25% solution of hydrofluoric acid for 10 minutes while suspended in solution in an ultrasonic vibration tank. After washing, the etched spacers are then coated with a mixture of methacrylate silane and a photoinitiator by immersing the spacers into a solution containing the initiator and an adhesion promoter such as a silane and then spraying the spacers into the top of a vertical drying column onto the substrate(s). Silanes improve the bonding between glass and polymers via chemical bonding at the silane/glass interface and a dispersion of the polymer into the silane at the silane/polymer interface.
6. Spacers are deposited onto the substrate surface with a density of at least 30 spacers/mm$^2$.
7. PIE elements approximately 25% of the size of the spacers are added to the LC/pre-polymer mix in a cross-sectional density approximately twice as great as that of the spacers.
8. The LC/pre-polymer mixture is deposited in sufficient quantity onto both inner faces of the substrates, and the substrates are laminated together while maintaining the proper alignment between the ITO patterns on the upper and lower substrates.
9. Both sides of the cell are then exposed to UV light which causes scission of the photoinitiator and release of free radicals around the spacers. The polymerization reaction will then proceed with the initiation sites centered around each spacer or PIE element that was deposited with the initiator.
10. The rate of polymerization is set at the beginning of the process by adjusting the UV intensity, while the rate of diffusion of the LC and pre-polymer is changed by adjusting the reaction temperature. Diffusion rates can also be controlled via the pre-polymer viscosity as well as by the judicious choice of the LC and pre-polymer to achieve the appropriate degree of miscibility of the two liquids. By adjusting the diffusion and reaction rates, the resulting LC/polymer structure can be engineered to achieve the desired morphology. For full phase separation, temperatures should be in excess of 45 degrees C. with a pre-polymer viscosity less than 1000 cps.

Figure 6:
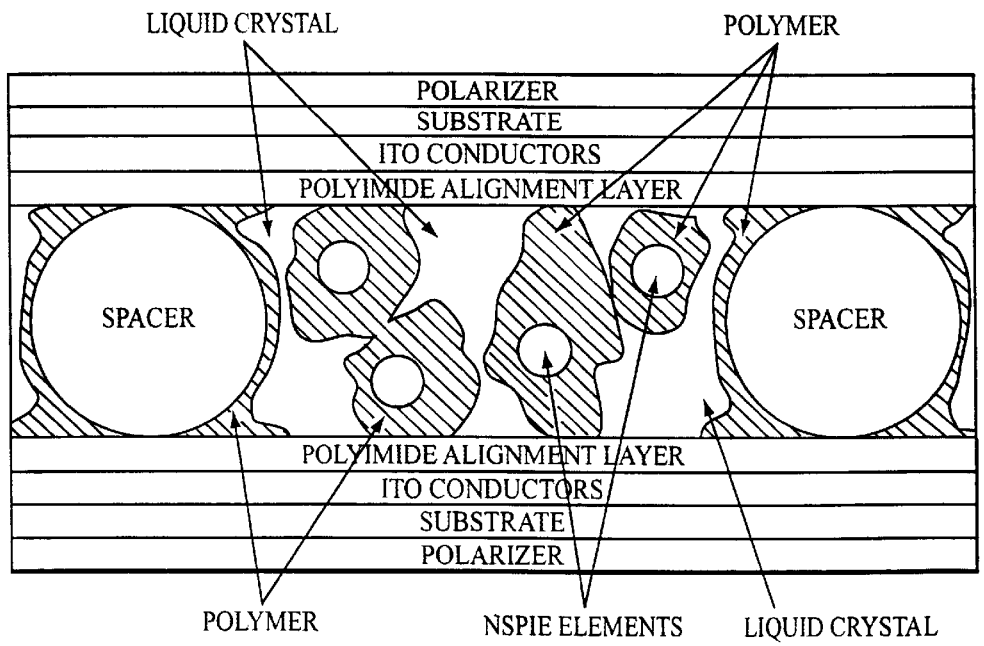
FIG. 6 shows a cross section of a liquid crystal display device that uses spherical spacers coated with a photoinitiator and non-structural polymer initiation or enhancement (PIE) elements after to exposure to the developing light.

If the non-structural PIE elements are larger than 50% of the spacer size, they will be distributed on a roughly two-dimensional, random lattice network. Upon polymerization, the polymer will grow from the PIE's in an approximately spherical shape, which with sufficient polymerization will extend onto the substrates, providing localized polymer attachment between the substrates. For non-structural PIE (NSPIE) elements less than 50% of the spacer size, if the NSPIE elements are mixed into the LC/pre-polymer mix prior to the display assembly, the NSPIE lattice network will be three-dimensional. At approximately 25% of spacer size and with a lattice network spacing of approximately 50% of the spacer diameter, an open-celled, integral network of polymer spheroids is formed with the LC filling the interpolymer regions (FIG. 6). This particular structure is useful for bistable displays in that it provides a high density of mechanical discontinuities that increase optical hysteresis necessary for bistability, as well as added durability.

In an alternative embodiment the polymerization initiator is not activated by light but rather is the 'accelerator lacquer' type. When using an accelerator lacquer initiator, coating of the spacers or NSPIE elements is accomplished via the method as previously described, but the polymerization begins to occur automatically at some time after the LC/polymer mixture is brought into contact with the initiator-coated spacers or NSPIE elements. Lamination is performed at room temperature in order to lengthen the time before cure begins. After lamination has been completed, the temperature is raised in order to increase the diffusivity of the LC and pre-polymer. In addition, the aromatic amines in the pre-polymer formulation and the peroxide in the lacquer are chosen so as to provide the correct free radical generation rate which, when combined with the diffusion rates of the pre-polymer and LC and the spacings within the display region, result in the polymer localized to the region surrounding the spacers or NSPIE elements.

The NSPIE elements may be glass or plastic spheres or rods typically used in display devices, but in this case smaller than the spacer elements for this particular display. Because the NSPIE elements are only in contact with, at most, one substrate, the NSPIE elements are not pressed against the substrates with excessive force during compression. As a result, the NSPIE elements may be of non-smooth shapes without causing damage to the substrates during compression. In addition, because the NSPIE elements aren't used to determine substrate spacing, they can be of widely varying shapes and sizes and still perform their function satisfactorily. These factors allow for the use of a much wider variety of materials for NSPIE elements than would be possible for standard spacer elements. For instance, a new class or materials, termed nanporous materials, is becoming available in which the pore size as well as total surface area can be specified and fabricated. These materials are typically ceramic or silica composites, formed by sintering, aerosol methods, or by chemical treatment of pre-existing minerals or glass. In nearly all these cases, however, the resulting particles are of poorly controlled size and/or shape, and often of a rough and sometimes sharp surface—they could not be used as spacer elements within the display device. As NSPIE elements, however, their porosity can be controlled to provide a relatively predetermined volumetric reservoir of photoinitiator, accelerator or other polymerization enhancement component. For instance, when working with accelerants or photoinitiators, it is necessary that these components be present in a concentration of 0.1–5% of the total pre-polymer in the display. That concentration can be achieved by adjusting the size, number and porosity of the NSPIE elements.

The NSPIE elements may also be deposited directly onto the substrates prior to assembly. This would typically be done in conjunction with NSPIE elements mixed into the LC\pre-polymer mix and would provide stronger bonding of the polymer to the substrate.

Two or more photoinitiators with different spectral sensitivities may be used to control when polymerization is initiated at a particular site. Since scission of the photoinitiator occurs when the photon energy of the light source exceeds a certain threshold, photoinitiators will typically be sensitive to light of wavelengths less than a specific value; thus, a photoinitiator sensitive to visible light will usually also be sensitive to ultraviolet light. One embodiment using this feature would be to coat the spacer elements with a visible light sensitive photoinitiator and to coat the NSPIE elements with a UV sensitive photoinitiator. The assembly is first exposed to visible light, resulting in the curing of only the polymer around the spacers. The assembly is then exposed to UV light, causing curing of any additional pre-polymer still in solution with the LC.

In another embodiment, other polymerization enhancing compounds such as adhesion promoters, or additives such as urethanes which improve elongation before tear properties are added to all, or some subset, of the NSPIE elements. NSPIE elements deposited on the substrates may have an additive that improves elongation before tear but decreasing the material's durometer (thus making it more susceptible to compression), while NSPIE elements mixed into the LC/polymer mix may not have such an additive and thus be of a higher durometer. In such a way, peel strength can be further enhanced.

One possible polymer is acrylic adhesives which have excellent optical clarity as well as the availability of a wide selection of manufactured optical grade versions of the material. Other polymers that might also be used are, for instance, epoxies or urethanes, though typically these classes of polymers do not have the optical properties equal to those of the acrylics. Acrylic adhesives are reactive cross-linking structural adhesives that cure by means of free-radical initiation. They are based on the methacrylate monomers and cure by addition polymerization. The formation of free radicals initiates a sudden and rapid chain reaction and curing of the adhesive. Condensation polymerization, on the other hand, typified by urethane and epoxies, proceeds at an approximately constant, usually lower reaction rate. Generation of free radicals for initiation of polymerization of acrylic based adhesives can be accomplished by a redox reaction such as that involving dimethyl aniline and peroxide. Because of the nature of the chain reaction, the free radicals can propagate from monomer to monomer and the cure itself can propagate up to 2.5 mm from the point of polymerization initiation. As a result of this cure propagation phenomenon, the accelerator and monomer do not have to be fully intermixed to achieve a full cure. This leads to several other methods for curing, where the accelerator can be in the form of a lacquer or thin layer on one surface allowing for the priming and storing of parts. In another related cure method termed 'honeymoon' or 'no-mix' in industry parlance, a two part adhesive is used which when brought into contact with each other (without any intermixing necessary) will result in the generation of sufficient free radicals to fully polymerize all the material.

Acrylics can also be cured by exposure to ultraviolet light less than 400 nm in wavelength, and in some instances by light in the visible range as well. In the case of photocurable adhesives, the free radical source is termed a photoinitiator and results in the formation of free radicals on exposure to light. Compounds which act as photoinitiators with light in the range of 200–300 nm are benzoine ethers, activated benzophenones and related compounds; benzyl dialkyl amino morpholinyl ketone is an example of a visible wavelength-activated photoinitiator. Photoinitiators are disassociated into segments forming free radicals by light in a process known as scission. One example of an equal mix curing system is embodied in U.S. Pat. No. 4,331,795, which uses a cobalt salt accelerator in one component and a hydroperoxide in the other element. Epoxies may also be formulated that can be UV-cured via cationic polymerization by incorporating reactive diluents and cyclic monomers. UV-initiated cationic curing of urethanes may be accomplished, for instance, by basing the formation on vinyl ether and polyurethane oligomers such as that manufactured by Allied Signal Inc.

Various other embodiments are possible. The PIE material may supply a constituent component of the pre-polymer that is essential to the initiation of curing but that is left out of the LC/pre-polymer mixture. That essential constituent is part of the PIE material and is deposited at one or more of the desired spacing elements within the display region, thus ensuring that initiation and cure will proceed from the desired locations only. The just-mentioned essential constituent component may be a photoinitiator, which is activated when exposed to either UV or visible light via scission. The rate of photopolymerization may be controlled by adjusting the intensity of the light source. The rate of diffusion of the phase separation process may be controlled by adjusting the temperature at which the reaction occurs. The rate of the photopolymerization may be varied during the course of the polymerization process in order to create multilayer, composite polymer/LC structures. The rate of the phase separation may be controlled by adjusting the miscibility of the LC and the pre-polymer. The rate of the phase separation may be controlled by adjusting the absolute and relative viscosities of the LC and the pre-polymer. The spacer elements may be coated with an accelerator lacquer or photoinitiator prior to device assembly and then dry-spray deposited onto one or more of the substrates. The spacer elements may be deposited via a wet-spray method in which the solution used as the deposition vehicle is either strictly composed of an accelerator or photoinitiator, or includes either or both of these compounds and a solvent, the concentration of which is adjusted to achieve the appropriate quantity of material to fully polymerize the pre-polymer within the display region around the spacers. The spacers may be mixed into a solution of the accelerator or photoinitiator. The solution is then dispensed in liquid form, via a method such as a pipette, silk screen or syringe, directly onto macroscopic regions on the substrates. The macroscopic region might be the outside perimeter, thereby automatically achieving an edge seal of the display during polymerization. The spacer elements may be porous structures, and the accelerator or photoinitiator is then allowed to absorb into the porous matrix in order to increase the weight percent of accelerator or photoinitiator in the desired localized region as well as to provide better interpenetration of the polymer and spacer elements, thus providing better adhesion. The spacer elements may be composed of glass, typically in the form of beads or rods, which are then etched to increase the surface area for improved adhesion. One or more layers of a an adhesion promoter such as a silane coupling agent may be coated onto the glass spacers which may or may not have been etched, prior to the coating of the glass spacers with the accelerator or photoinitiator. The spacer elements may be admixed to the photoinitiator or accelerator in concentrations higher than what would be desired in regions of the display that are active image areas; the mixture is then deposited onto the substrate via printing or pipette methods into the interpixel regions or the perimeter where no image is presented, thus providing additional support without adversely affecting the image contrast or quality. The initiator may be solely heat activated or heat activated as well as photo-activated or other activation method. The polymer is chosen so as to contract following initial bonding to the substrates and upon curing; the two substrates are thus drawn together, increasing durability of the display; this is particularly effective when the polymer is localized around the spacer element, as has been previously described. The spacer element may be one or more sheets of an extensible porous membrane that when laminated in between the substrates is the element that determines the spacing between the substrates.

In this and other embodiments, one or more of substrates may be glass or other rigid material.

In another embodiment, comprising one or more non-structural polymerization initiation or enhancement (PIE) elements of a thickness less than the size of the spacers (such that the non-structural PIE elements are not in contact with more than one of the substrates and thus do not provide direct compressive structural support), the photoinitiator, accelerator, or other polymerization enhancement material is coated onto or contained within the nonstructural PIE (NSPIE) element.

Other embodiments of the invention are within the following claims.

What is claimed is:

1. A method of manufacturing a liquid crystal display device, comprising:

filling the space between two facing substrates with a mixture of pre-polymer and liquid crystal material;

applying an external source of energy to initiate a polymerization, wherein as the polymerization proceeds a phase separation of the polymer and liquid crystal is generally also proceeding;

after initiation of polymerization and before completion thereof, adjusting a parameter that affects one or both of the rates of polymerization and phase separation, so as to produce a variation in the polymerized structure along a direction normal to the two facing substrates, wherein the variation is a result of the rates of polymerization and/or phase separation being adjusted during the course of polymerization.

2. The method of claim 1 wherein at least a first and second layer is formed within the liquid crystal display device with the first and second layers overlying one another and being positioned at different locations along the direction normal to the two facing substrates, wherein the structure of the first and second layers is different as a result of the rates of polymerization and/or phase separation being different during the time that the layers are formed.

3. The method of claim 1 wherein the variation in the polymerized structure changes in a continuous fashion as a result of the rates of polymerization and/or phase separation being different during the time that the structure is formed.

4. The method of claim 1 or 2 wherein the rate of polymerization is adjusted.

5. The method of claim 4 wherein the intensity of a light source affecting the rate of polymerization is adjusted to adjust the rate of polymerization.

6. The method of claim 5 wherein the light source is ultraviolet light.

7. The method of claim 1 or 2 wherein the rate of phase separation is adjusted.

8. The method of claim 7 wherein a temperature is adjusted to adjust the rate of phase separation.

9. The method of claim 2 wherein the first layer is primarily polymer.

10. The method of claim 9 wherein the second layer is primarily a mixture of polymer and liquid crystal material.

11. The method of claim 10 further comprising a third layer, different in structure from the first and second layers as a result of the relative rate of polymerization and phase separation being different during the time that the layers are formed.

12. The method of claim 11 wherein the third layer is primarily liquid crystal material.

13. The method of claim 11 wherein the second layer contains droplets of liquid crystal material within surrounding polymer.

14. The method of claim 13 wherein the droplets of liquid crystal are in contact with a substrate.

15. The method of claim 2 wherein the pre-polymer and liquid crystal are of such a composition and the polymerization occurs under such conditions that the structure of the first and second layer can be determined by varying the miscibility of the pre-polymer and liquid crystal material.

16. The method of claim 2 wherein the pre-polymer and liquid crystal are of such a composition and the polymerization occurs under such conditions that the structure of the first and second layer can be determined by varying the viscosity of the pre-polymer and liquid crystal.

17. The method of claim 16 wherein the viscosity is the relative viscosity of the pre-polymer and liquid crystal.

18. The method of claim 16 wherein the viscosity is the absolute viscosity of the pre-polymer and liquid crystal.

19. The method of claim 1 wherein the polymerization is adjusted so as to produce a continuous function of time that takes the form of a ramp, an exponential curve, or other mathematical function.

20. The method of claim 1 wherein the intensity of a light source affecting the rate of polymerization is adjusted to adjust the rate of polymerization.

21. The method of claim 1 wherein the rate of phase separation is changed abruptly so as to produce stepwise change in phase separation rate.

22. The method of claim 1 wherein the phase separation is adjusted so as to produce a continuous function of time that takes the form of a ramp, an exponential curve, or other mathematical function.

23. The method of claim 1 wherein the variation in the polymerized structure along a direction normal to the two facing substrates includes a continuous variation along at least a portion of the normal direction.

24. The method of claim 1 wherein the variation in the polymerized structure along a direction normal to the two facing substrates includes a plurality of layers in which the polymerized structure is different.

25. The method of claim 24 wherein there are more than two such layers in which the polymerized structure is different.

* * * * *

UNITED STATES PATENT AND TRADEMARK OFFICE
CERTIFICATE OF CORRECTION

PATENT NO.    : 6,618,114 B2
DATED         : September 9, 2003
INVENTOR(S)   : Gary A. Freeman It is certified that error appears in the above-identified patent and that said Letters Patent is hereby corrected as shown below:

Column 3,
Line 35, after "device", delete ", he" and insert -- . The --.

Column 4,
Line 31, insert the following paragraph: -- Other features and advantages of the invention will be apparent from the following detailed description and from the claims, and from the disclosure and claims of my applications entitled, "Electrooptical Displays with Polymer Localized in Vicinities of Substrate Spacers," Electrooptical Displays Constructed with Polymerization Initiating and Enhancing Elements Positioned Between Substrates," and "Electrooptical Displays Constructed with Polymer-Coated Elements Positioned Between Substrates," each filed on even date herewith (and incorporated herein by reference). --
Line 52, after "after", delete "to".

Column 10,
Line 56, before "an", delete "a".

Signed and Sealed this

Twenty-third Day of March, 2004

JON W. DUDAS
*Acting Director of the United States Patent and Trademark Office*